United States Patent [19]
von Flotow et al.

[11] Patent Number: 5,810,319
[45] Date of Patent: Sep. 22, 1998

[54] ADAPTIVELY TUNED VIBRATION ABSORBER WITH DUAL FLEXURES

[75] Inventors: Andreas H. von Flotow; Timothy Mixon, both of Hood River, Oreg.; Luigi Maggi, Long Beach, Calif.

[73] Assignee: Applied Power Inc., Butler, Wis.

[21] Appl. No.: 839,274

[22] Filed: Apr. 17, 1997

[51] Int. Cl.$^6$ .................................................. B64D 27/00
[52] U.S. Cl. .......................... 248/550; 248/554; 244/54; 181/207; 188/380
[58] Field of Search .................................. 248/550, 554, 248/556, 557, 638; 244/54, 1 N; 181/207; 267/175; 188/379, 380

[56] References Cited

U.S. PATENT DOCUMENTS 3,487,888   1/1970   Adams et al. ........................ 248/554 X
3,490,556   1/1970   Bennett, Jr. et al. ................ 248/554 X

*Primary Examiner*—Ramon O. Ramirez
*Assistant Examiner*—Long Dinh Phan
*Attorney, Agent, or Firm*—Quarles & Brady

[57] ABSTRACT

An apparatus for counteracting vibrations includes a housing for attachment to a vibrating member. First and second bodies are connected to the housing by first and second springs, respectively, with a combined stiffness which defines a resonant frequency at which the first and second bodies oscillate with respect to the housing. Each of the first and second springs include a plurality of rods fixedly connected between a pair of rings. A lever engages the first and second bodies to vary a spacing between those bodies when force from an actuator is applied to the lever. The lever action alters the stiffness of the first and second springs which varies the resonant frequency of the vibration absorber.

18 Claims, 4 Drawing Sheets

ADAPTIVELY TUNED VIBRATION ABSORBER WITH DUAL FLEXURES

FIELD OF THE INVENTION

The present invention relates to devices for countering vibration in structural members, such as the frame of an aircraft; and particularly to such devices which can be tuned dynamically to adapt performance to changes in vibration frequency.

BACKGROUND OF THE INVENTION

Aircraft engines can induce significant vibration into the airframe. In propeller powered planes, the propeller blades produce air pressure pulses which strike external surfaces thereby causing a time periodic vibration of the structure, at about 100 Hz for example, which vibration is transferred to other structural members of the airframe. Jet engines also produce vibration in supporting members. If left unchecked, the induced vibrations create objectionable noise in the aircraft cabin, and may result in serious fatigue of the airframe.

As a consequence, vibration absorbers are attached to structural members throughout the aircraft. For example, the Fokker 50 turbo-prop airplane carries 150 frame-mounted absorbers. These devices typically are a simple spring-mass system in which a mass is attached to the airframe by a resilient member that acts as a spring allowing the mass the oscillate. Elastomeric pads and metal cantilevers have been employed as the spring. The spring-mass system is fixedly tuned to resonate at the frequency of common vibration in the structural member of the airframe to which the absorber is attached and thus optimally absorbs the vibration energy at that frequency. The absorber has a large mechanical impedance at resonance which is due mostly to a large quality factor Q. Absorption (mechanical impedance) at other frequencies diminishes as a function of the deviation from the resonant frequency.

A drawback of fixedly tuned absorbers is that the frequency of airframe vibration varies with engine speed, especially with jet powered aircraft. Although the absorber may be tuned to the vibration frequency which occurs at the nominal cruising speed of the aircraft, less that optimal vibration absorption occurs at other speeds. In addition, the tuning of elastomeric type absorbers changes with the age and temperature of the resilient material.

Therefore, it is desirable to provide an absorption system which is dynamically adaptive to variation of the vibration frequency and other factors.

SUMMARY OF THE INVENTION

An object of the present invention is to provide a system for absorbing energy from time periodic vibrations in a structural member wherein the system is autonomously capable of adapting to different vibration frequencies.

Another object is to provide a vibration absorber that has a mass-spring system with a resonant frequency which is adjusted dynamically to track changes in the frequency of the vibration in the structural member.

A further object is to provide a vibration absorber in which the resonant frequency is adjusted dynamically by varying a pre-stress that is applied to the spring.

These objectives are fulfilled by a vibration absorber which has a housing for attachment to a vibrating member. A first body is coupled to the housing by a first spring and a second body is coupled to the housing by a second spring. In the preferred embodiment of the vibration absorber, the first and second springs each comprise a pair of rings with a plurality of rods connected between the rings. The rods are flexible thus enabling the first and second bodies to vibrate with respect to the housing, and the first and second springs have a stiffness which defines a resonant frequency at which the first and second bodies vibrate.

A coupling separates the first and second bodies by a variable distance. An actuator is operatively connected to the coupling to vary the distance between the first and second bodies, thereby altering the stiffness of the first and second springs and the resonant frequency. This allows the resonant frequency to be altered to match changes in the frequency of vibration of the member to which the vibration absorber is attached. In the preferred embodiment, the coupling comprises a lever ring and a thrust bearing. The lever ring has a first circumferential region which engages both the first and second bodies. The thrust bearing comprises first and second ramped races with balls therebetween, wherein the first ramped race engages a second circumferential region of the lever ring and the second ramped race rotated by the actuator.

DETAILED DESCRIPTION OF THE INVENTION

Figure 1:
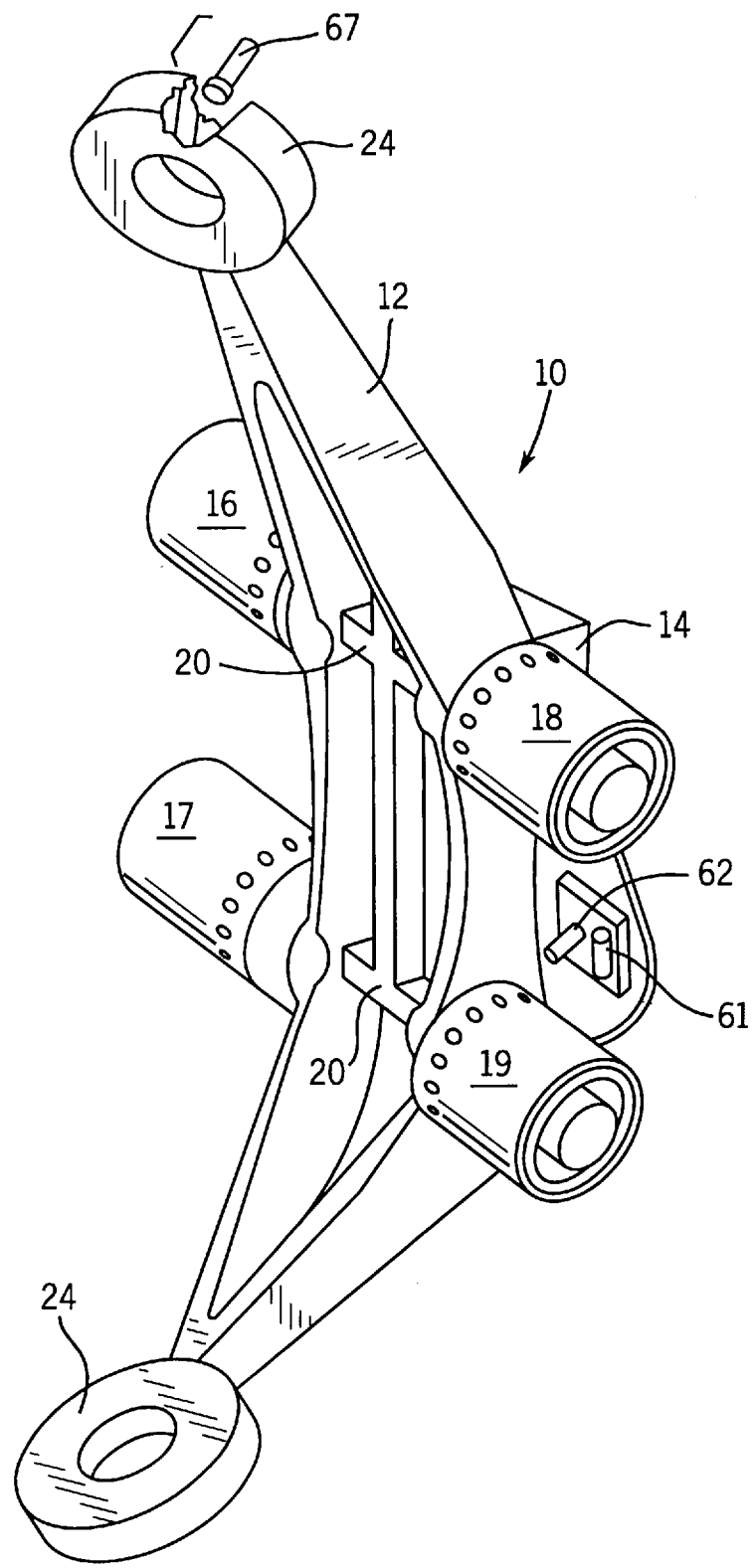
FIG. 1 an isometric view of four vibration absorbers according to the present invention attached to a mounting structure for an aircraft engine.

With initial reference to FIG. 1, an aircraft engine is attached to the airframe by a mounting structure 10 which is formed by a support yoke 12 fixed to the outer edge of a pylon 14 projecting from the aircraft fuselage, as described in U.S. Pat. No. 3,490,556. The exemplary support yoke 12 being illustrated is for a Douglas Aircraft Company DC-9 series aircraft and is a single forging fastened to the pylon 14. The ends of the support yoke 12 have annular cups 24 that house resilient mounts through which bolts pass to attach the engine. A separate vibration absorber 16, 17, 18 or 19 is connected to the support yoke 12 opposite cross rods 20 with vibration absorbers 16 and 17 being on the forward side of the support yoke 12 and vibration absorbers 18 and 19 being on the aft side. The forward vibration absorbers 16 and 17 are tuned to vibrations in the vertical axis, and the aft vibration absorbers 18 and 19 are tuned to horizontally directed vibration, as will be described. An engine for a DC-9 series aircraft has two spools that rotate at different speeds and one of the vertically and one of the horizontally tuned absorbers reacts to vibration from a separate engine spool. Although the vibration absorbers 16–19 are functionally identical otherwise, they may differ in size to correspond to differences in the amplitude of the vibration produced by each engine spool.

Figure 2:
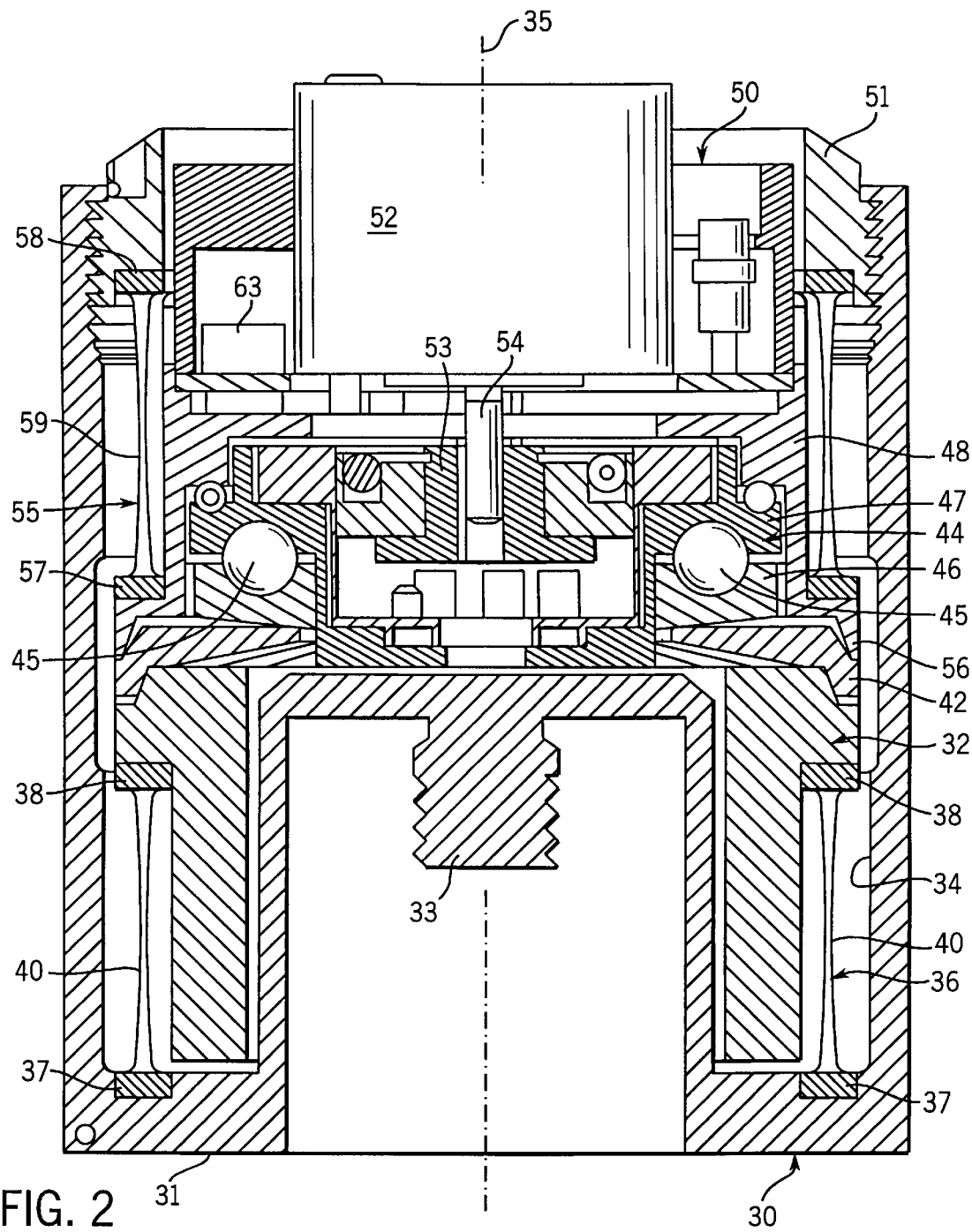
FIG. 2 is longitudinal cross sectional view through one of the vibration absorbers.
Figure 3:
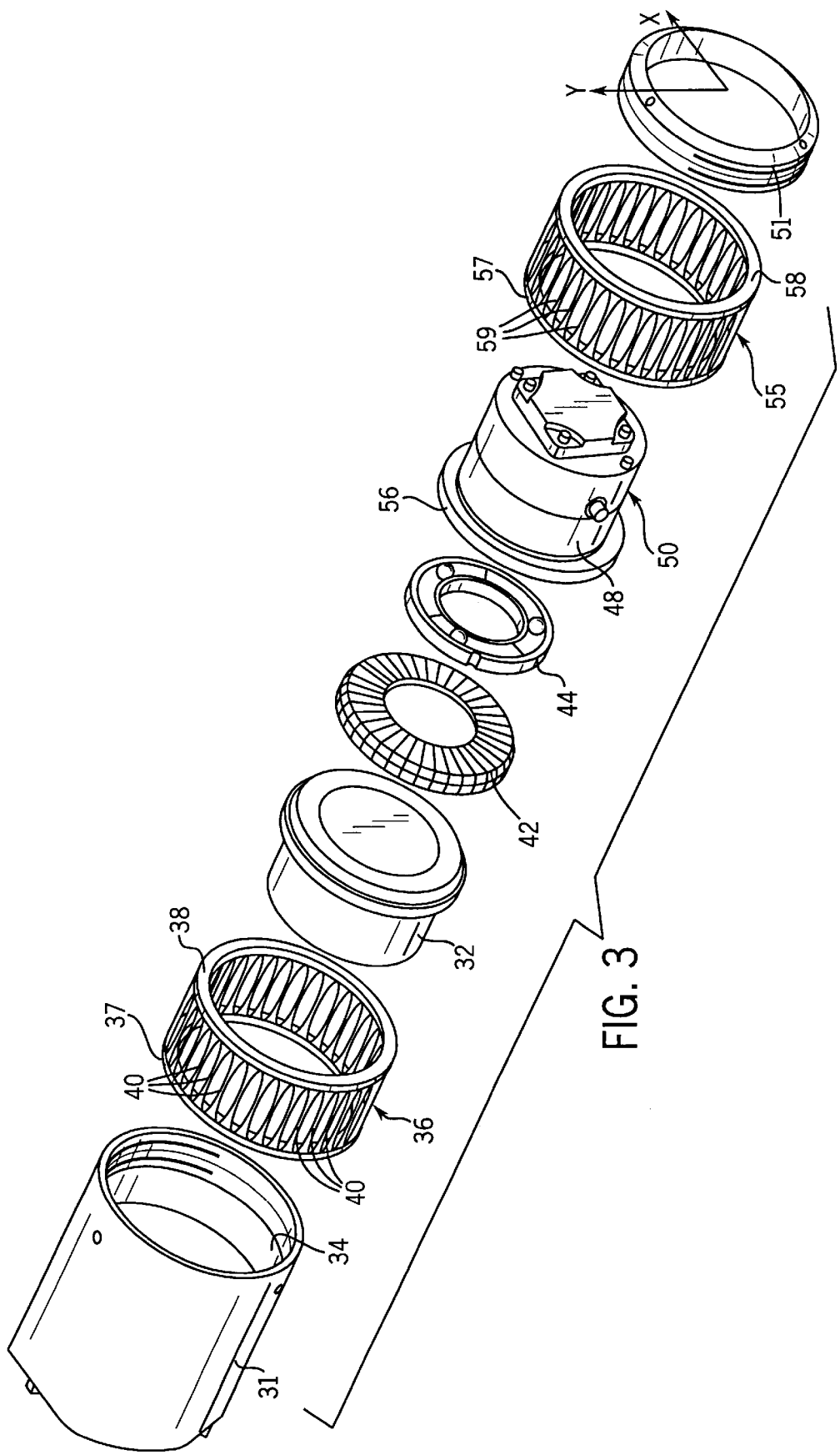
FIG. 3 is an exploded view of the vibration absorber.

FIGS. 2 and 3 show the details of one of the vibration absorbers 16. The vibration absorber 16 includes an circular cup-like outer housing 30 with a closed end 31 that has a mounting stud 33 for coupling to the support yoke 12. The vibration absorber 16 reacts to vibrations occurring along two orthogonal axes X and Y that lie in a plane which is perpendicular to the longitudinal axis 35 of the vibration absorber.

A cylindrical, tubular proof-mass 32 is located within the cavity 34 of the outer housing 30 and is spaced from the closed end 31 of the housing by a first flexure 36. The first flexure 36 comprises two parallel circular rings 37 and 38 with a plurality of circular cross-section rods 40 extending therebetween. The rods 40 taper from each ring 37 and 38 to a smaller diameter cross section at the mid-point between the rings which enables rods 40 to flex along axes X and Y so that first flexure 36 acts as a spring. An outer circumferential region of a ring lever 42 abuts the side of proof-mass 32 which is remote from the first flexure 36. A ramped thrust bearing 44 engages central portion of the opposite side of the ring lever 42. The ramped thrust bearing 44 comprises two ramped races 46 and 47 with balls 45 therebetween. The ramped races 46 and 47 move toward and away from each other along the longitudinal axis 35 as the ramped races rotate with respect to each other.

A motor assembly 50 has a tubular body 48 surrounding the thrust bearing 44 and contacts the outer circumferential region of ring lever 42. Fastened to the tubular body 48 is a bidirectional DC stepper motor 52, such as model 421817-01-HT1 manufactured by LIN Engineering of Santa Clara, Calif. USA, in which the direction of rotation determined by applied electrical signals. Alternatively, a DC motor may be used. The motor has an output shaft 54 connected to a 100:1 harmonic drive gearbox 53 which rotationally drives the upper race 47 of the ramped thrust bearing 44. The thrust bearing's lower race 46 is splined at the outer diameter and engages the tubular body 48 of motor assembly 50, thereby preventing the lower race from rotating while allowing movement along axis 35 within the housing 30.

A second flexure 55 rests against a flange 56 which projects outwardly from the tubular body 48 of the motor assembly 50, yet is spaced from the inner surface of the housing 30. The second flexure 55 is identical to the first flexure 36 being formed by two parallel round rings 57 and 58 with a plurality of flexible circular rods 59 extending therebetween which act as springs. A locking ring 51 is threaded into the open end of the housing 30 and abuts ring 58 of the second flexure 55. Tightening the locking ring 51 exerts force which squeezes the internal components of the vibration absorber 16 between the locking ring and the closed end 31 of the housing 30 which pre-stresses the first and second flexure assemblies 36 and 55 in compression.

The combined mass of the proof-mass 32 and motor assembly 50 is supported within the housing 30 by the first and second flexure assemblies 36 and 55 which act as a pair of springs allowing that combined mass to oscillate in two orthogonal axes X and Y in a plane which is perpendicular to the longitudinal axis 35 of the vibration absorber 16. The spring/mass combination has a resonant frequency of oscillation that is a function of the combined mass and the stiffness of the springs formed by the first and second flexure assemblies 36 and 55. The stiffness is a function of the magnitude of the stress, i.e. compression or tension, exerted longitudunally on the flexure assemblies 36 and 55. When this resonant frequency matches the frequency of vibration in the engine mounting structure 10, that vibration energy is absorbed optimally by oscillation of the proof-mass 32 and motor assembly 50.

By altering the stress, e.g. compression, acting on the rods 40 and 59 in the flexure assemblies, the spring stiffness can be changed to vary the resonant frequency and tune the vibration absorber 16. Alteration of the stress of the first and second flexure assemblies 36 and 55 is performed by activating the motor assembly 50 which produces rotation of the motor output shaft 54 and results the upper race 47 of the thrust bearing 44 rotating with respect to the lower race 46. Because each race 46 and 47 has a ramped track in which the metal balls 45 ride, this rotational movement causes those bearing races to move apart or together along axis 35 depending upon the direction of motor rotation. This axial movement affects the thickness of the thrust bearing 44 thereby exerting greater or lesser force on the central region of ring lever 42 in a direction along the longitudinal axis 35 of the vibration absorber 16. This change in force causes the ring lever 42 to flex between the proof-mass 32 and the tubular body 48 of the motor assembly 50 which alters the spacing between those components 32 and 48. Alteration of that spacing changes the compressive stress of rods 40 and 59 of the first and second flexure assemblies 36 and 55, and thus the spring stiffness of the vibration absorber 16. Therefore by properly controlling the motor assembly 50, the resonant frequency of the vibration absorber 16 can be changed to track variation of the frequency of vibration in the support yoke 12.

Motor assembly 50 is driven by a electronic controller to vary the spring stiffness of each vibration absorber 16–19 in response to changes in structural vibration as sensed by accelerometers. Referring again to FIG. 1, the structural vibrations are sensed by two airframe accelerometers 61 and 62 attached to the pylon 24. The airframe accelerometers 61 and 62 and are oriented to sense vibrations along orthogonal axes that are parallel to the axes about which the proof-mass 32 in each absorber 16–19 can oscillate. The first airframe accelerometer 61 senses vertical acceleration and is used to control the two forward vibration absorbers 16 and 17 on engine mounting structure 10, and the second airframe accelerometer 62 senses horizontal acceleration and tunes the two aft mounted vibration absorbers 18 and 19.

As shown in FIG. 2, each vibration absorber 16–19 has an accelerometer 63 fixed to the motor assembly 50 to provide a signal indicative of proof-mass vibration along an axis perpendicular to the longitudinal axis 35. This proof-mass accelerometer 63 for a given vibration absorber 16, 17, 18 or 19 is oriented to sense movement along an axis that is parallel to the sensing axis of the airframe accelerometers 61 or 62 coupled to the given vibration absorber. For example, the proof-mass accelerometer 63 for vibration absorber 16 and the associated airframe accelerometer 61 both sense vertical vibrations.

Figure 4:
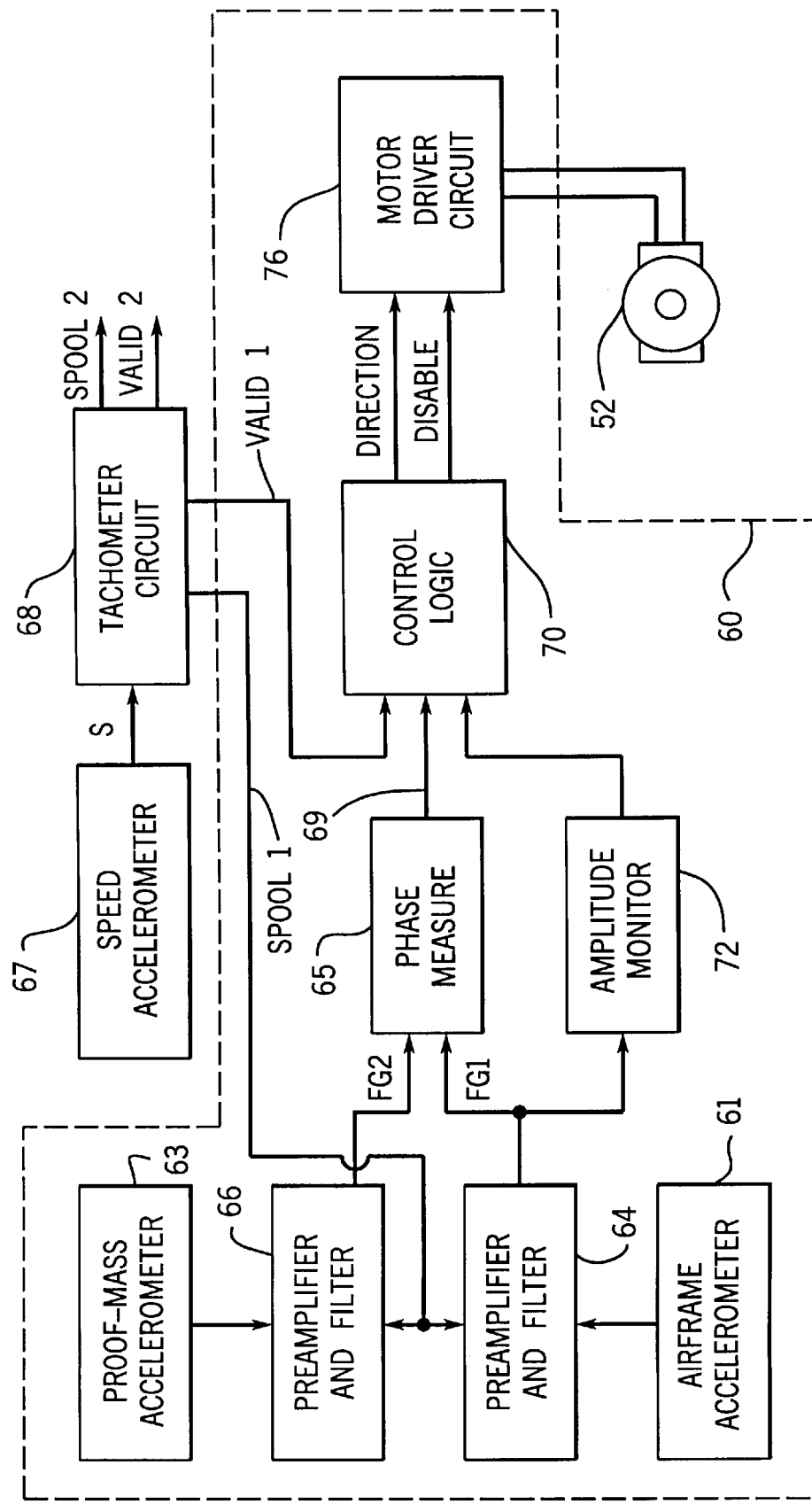
FIG. 4 is a block schematic diagram of a control circuit for sensing airframe vibrations and adjusting the resonant frequency of the vibration absorber.

With reference to FIG. 4, the signals from these two accelerometers are applied to the control circuit 60. Specifically, the signal produced by airframe accelerometer 61, indicating the structural vibration, is applied to an input of a first preamplifier and filter circuit 64 which extracts the signal at the excitation frequency of the airframe accelerometer and converts the extracted signal into a square wave. This square wave signal FG1, produced by the first preamplifier and filter circuit 64, is applied to one input of a phase measure circuit 65.

The output signal from the proof-mass accelerometer 63 is fed to a second preamplifier and filter circuit 66 which extracts the signal at an excitation frequency of the proof-mass accelerometer and converts the resultant signal into a square wave. That square wave signal FG2 from the second preamplifier and filter circuit 66 is applied to another input of the phase measure circuit 65.

The filters in the first and second preamplifier and filter circuits 64 and 66 are tuned to the speed of the associated engine spool by signals from a tachometer circuit 68. The tachometer circuit 68 receives the output signal S from a speed accelerometer 67 affixed to the upper annular cup 24 of the engine support yoke 12 (see FIG. 1) and thus is rigidly coupled to the case of the engine for sensing engine speed. From the speed accelerometer signal S, a single tachometer circuit 68 derives speed signals for both engine spools for use by the four vibration absorbers 16–19. The tachometer circuit 68 has separate filter chains which are individually tuned to select the frequency of a different engine spool and thus produce a signal SPOOL1 or SPOOL2 indicating the speed of each engine spool. The signal SPOOL1 for the engine spool associated with vibration absorber 16 is applied as a tuning signal to the first and second preamplifier and filter circuits 64 and 66. The tachometer circuit 68 also produces an output signal VALID1 when the speed indication for the associated engine spool is valid. The VALIDN1 signal is applied to a control logic circuit 70.

The phase measure circuit 65 determines the phase difference between the two filtered accelerometers signals FG1 and FG2. When the resonant frequency of the vibration absorber 16 matches the frequency of the airframe vibration, the two accelerometer signals are in quadrature, i.e. ninety degrees out of phase. At that time, phase measure circuit 65 produces an output voltage level $V_{90}$ indicative of the quadrature relationship; for example, the $V_{90}$ level may equal one-half the supply voltage to the phase measure circuit. Phase shift of the two accelerometer signals from quadrature results in deviation of the phase measure circuit output voltage from the quadrature voltage level $V_{90}$. The amount of deviation indicates the magnitude of the out of quadrature phase difference and the deviation direction indicates the direction of phase shift between the two accelerometer signals.

The output from the phase measure circuit 65 is applied via line 69 to the control logic circuit 70. However, due to an RC network which integrates the phase relationship signal in the phase measure circuit, the output signal may have a slight ripple. To avoid erroneous adjustment of the absorber's resonant frequency, control logic circuit 70 contains a window comparator which defines a voltage range, e.g. two volts, centered about the quadrature voltage level $V_{90}$. When the phase measure circuit's output voltage is inside this two volt range, the control logic circuit 70 produces a true DISABLE signal, otherwise a false DISABLE signal is produced. A true DISABLE signal inhibits operation of the DC stepper motor 52 and thus alteration of the spring stiffness for the vibration absorber 16. Therefore, when the accelerometer signals deviate significantly from quadrature, the signal on line 69 will be outside the two volt range resulting in activation of the DC stepper motor 52.

The control logic circuit 70 also produces a true DISABLE signal in response to a signal from an amplitude monitor 72 which receives the filtered airframe accelerometer signal FG1. The amplitude monitor output results in a true DISABLE signal when the signal from the airframe accelerometer 61 is too small to provide reliable tuning of the vibration absorber 16.

The control logic circuit 70 also responds to the direction of the phase shift between the two accelerometer signals by producing a DIRECTION signal that indicates in which direction the DC stepper motor 52 should be operated to tune the vibration absorber.

When the resonant frequency of the vibration absorber 16 is properly tuned to the frequency of airframe vibration, the signals from the accelerometers 61 and 63 are in quadrature.

This signal state causes the control logic circuit 70 to produce a true DISABLE signal which inhibits the motor driver 76 from operating the stepper motor 52. Thus the stress exerted on the flexure assemblies 36 and 55 is held constant, thereby maintaining the resonant frequency fixed.

When the vibration absorber 16 is not properly tuned, the signals from the airframe and proof-mass accelerometers 61 and 63 will be out of quadrature. This condition results in the phase measure circuit's output signal being outside the two volt range set by the window comparator in the control logic circuit 70. As a consequence, the control logic circuit 70 produces a false DISABLE signal which causes the motor driver 76 to produce a drive signal for the DC stepper motor 52. That drive signal activates the motor to move in the direction specified by the DIRECTION signal from the control logic circuit 70. The stepper motor 52 produces relative movement between the races 46 and 47 of the ramped thrust bearing 44, which as described previously alters the stress, i.e. compression, of the flexure assemblies 36 and 55. This changes the stiffness of the spring and proof-mass system and thus the resonant frequency of the vibration absorber 16. The direction of motor rotation alters the resonant frequency in a direction toward proper tuning for optimal vibration absorption.

In this manner, the resonant frequency of the vibration absorber 10 is changed to track variations in vibration frequency which result from changes in the aircraft engine speed. Adjustment of the absorber tuning also compensates for effects due to temperature changes and aging flexure assemblies.

We claim:

1. A vibration absorber comprising:
    a housing for attachment to a vibrating member;
    a first body;
    a first spring coupling the first body to the housing, and including first and second rings with a first plurality of rods fixedly connected between the first and second rings;
    a second body;
    a coupling which engages the first and second bodies to provide given distance between the first and second bodies;
    a second spring coupling the second body to the housing, and including third and fourth rings with a second plurality of rods fixedly connected between the third and fourth rings, wherein the first and second springs have a stiffness which defines a resonant frequency at which the first and second bodies oscillate with respect to the housing; and
    an actuator operatively connected to the coupling to vary the given distance between the first and second bodies, thereby altering the stiffness of the first and second springs and the resonant frequency.

2. The vibration absorber as recited in claim 1 wherein the coupling comprises a lever which engages the first body, the second body and the actuator.

3. The vibration absorber as recited in claim 1 wherein the coupling comprises a lever ring which has a first circumferential region engaging the first body and the second body, and a second circumferential region engaging the actuator.

4. The vibration absorber as recited in claim 1 wherein the coupling comprises a bearing having first and second ramped races with balls therebetween, the first ramped race engages the second circumferential region of the lever ring and the second ramped race engages the actuator.

5. The vibration absorber as recited in claim 4 wherein the actuator comprises a motor which is coupled to the second ramped race to rotate the second ramped race.

6. The vibration absorber recited in claim 5 wherein a gear transmission couples the motor to the second ramped race.

7. The vibration absorber as recited in claim 5 wherein the motor is coupled to the second ramped race by a harmonic drive gearbox.

8. The vibration absorber as recited in claim 1 wherein each one of the first plurality of rods tapers to a place of minimum cross sectional area that is spaced from both the first and second rings; and each one of the second plurality of rods tapers to a place of minimum cross sectional area that is spaced from both the third and fourth rings.

9. The vibration absorber as recited in claim 1 further comprising a vibration sensor attached to one of the first and second bodies.

10. A vibration absorber comprising:

a housing for attachment to a vibrating member;

a first body;

a second body;

a lever which engages the first body and the second body to vary a spacing between the first body and the second body;

a bearing having first and second ramped races with balls therebetween, and having a thickness that varies with rotational movement between the first and second ramped races, the first ramped race engages the lever ring;

a first spring coupling the first spring to the housing;

a second spring coupling the second body to the second end of the housing, wherein the first and second springs have a stiffness that defines a resonant frequency at which the first and second bodies oscillate with respect to the housing; and a motor attached to the second body and operatively coupled to the second ramped race to rotate the second ramped race and vary the thickness of the bearing thereby altering the stiffness of the first and second springs and the resonant frequency.

11. The vibration absorber as recited in claim 10 wherein the first and second springs each comprise a pair of rings with a plurality of rods connected between the pair of rings.

12. The vibration absorber as recited in claim 10 wherein the lever is a ring which has a first circumferential region which engages the first body and the second body, and has a second circumferential region which engages the first ramped race.

13. The vibration absorber as recited in claim 12 wherein each one of the plurality of rods tapers to a place of minimum cross sectional area that is between the pair of rings.

14. The vibration absorber as recited in claim 10 wherein the motor is coupled to the second ramped race by a harmonic drive gearbox.

15. A vibration absorber comprising:

a housing for attachment to a vibrating member and having a first end and a second end;

a first body;

a first spring coupling the first body to the first end of the housing, and including first and second rings with a first plurality of rods fixedly connected therebetween;

a second body;

a second spring coupling the second body to the second end of the housing, and including third and fourth rings with a second plurality of rods fixedly connected therebetween, wherein the first and second springs have a stiffness which defines a resonant frequency at which the first and second bodies oscillate with respect to the housing; and a lever which engages the first body and the second body to vary a spacing between the first body and the second body;

a bearing having first and second ramped races with balls therebetween, and having a thickness that varies with rotational movement between the first and second ramped races, the first ramped race engages the lever ring; and a motor attached to the second body and having an output shaft which rotates the second ramped race thereby varying the thickness of the bearing to produce a change of the stiffness of the first and second springs and of the resonant frequency.

16. The vibration absorber as recited in claim 15 wherein the lever is in the form of a ring having a first circumferential region engaging the first body and the second body, and a second circumferential region engaging the motor.

17. The vibration absorber as recited in claim 15 wherein each one of the first plurality of rods tapers to a place of minimum cross sectional area that is spaced from both the first and second rings; and each one of the second plurality of rods tapers to a place of minimum cross sectional area that is spaced from both the third and fourth rings.

18. The vibration absorber as recited in claim 15 wherein the second end of the housing is open and has a locking ring therein which engages the second spring.

* * * * *